April 1, 1958      R. N. BRITZ      2,829,286
SEALED ELECTRIC MOTOR
Filed June 16, 1955      2 Sheets-Sheet 1
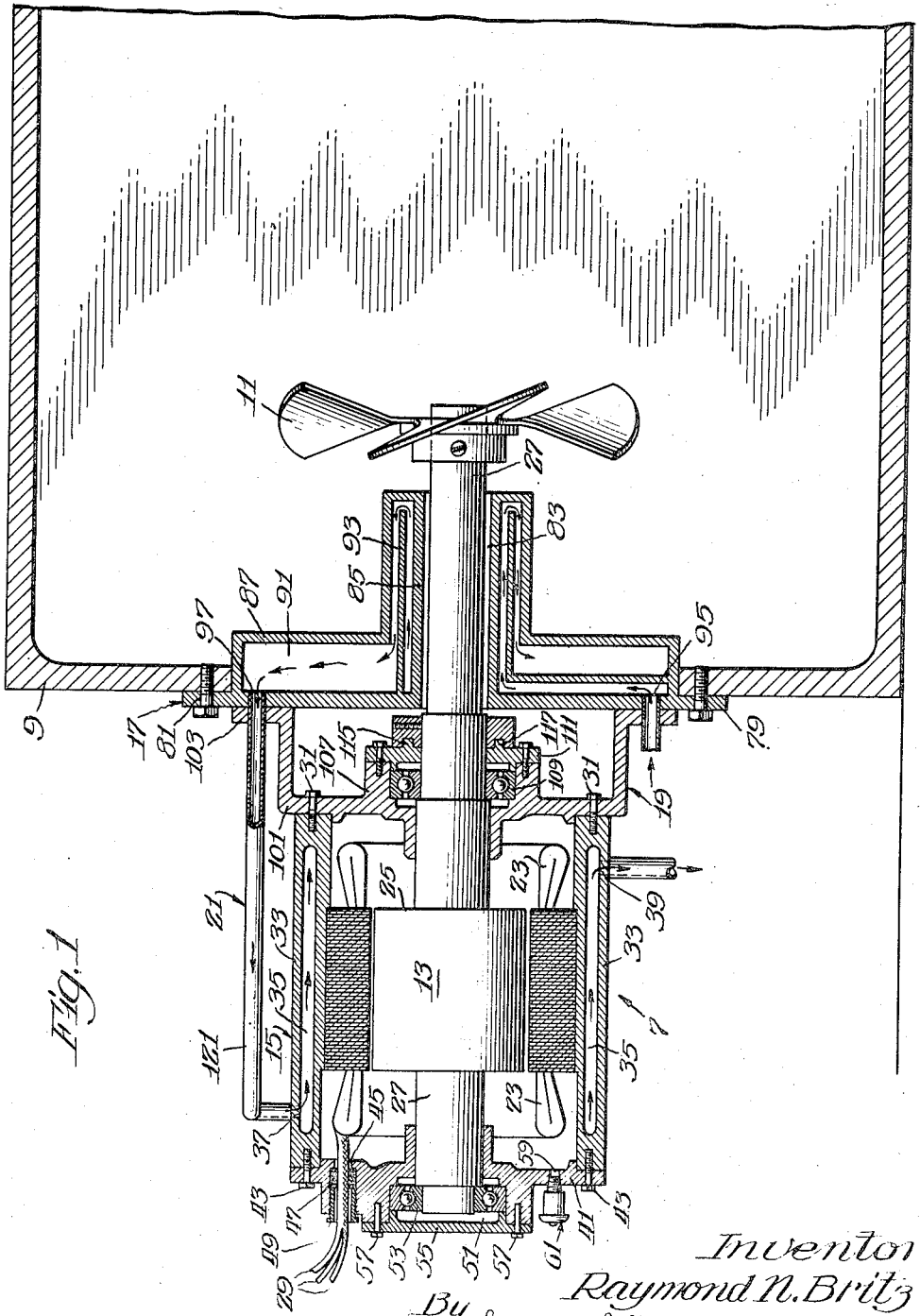

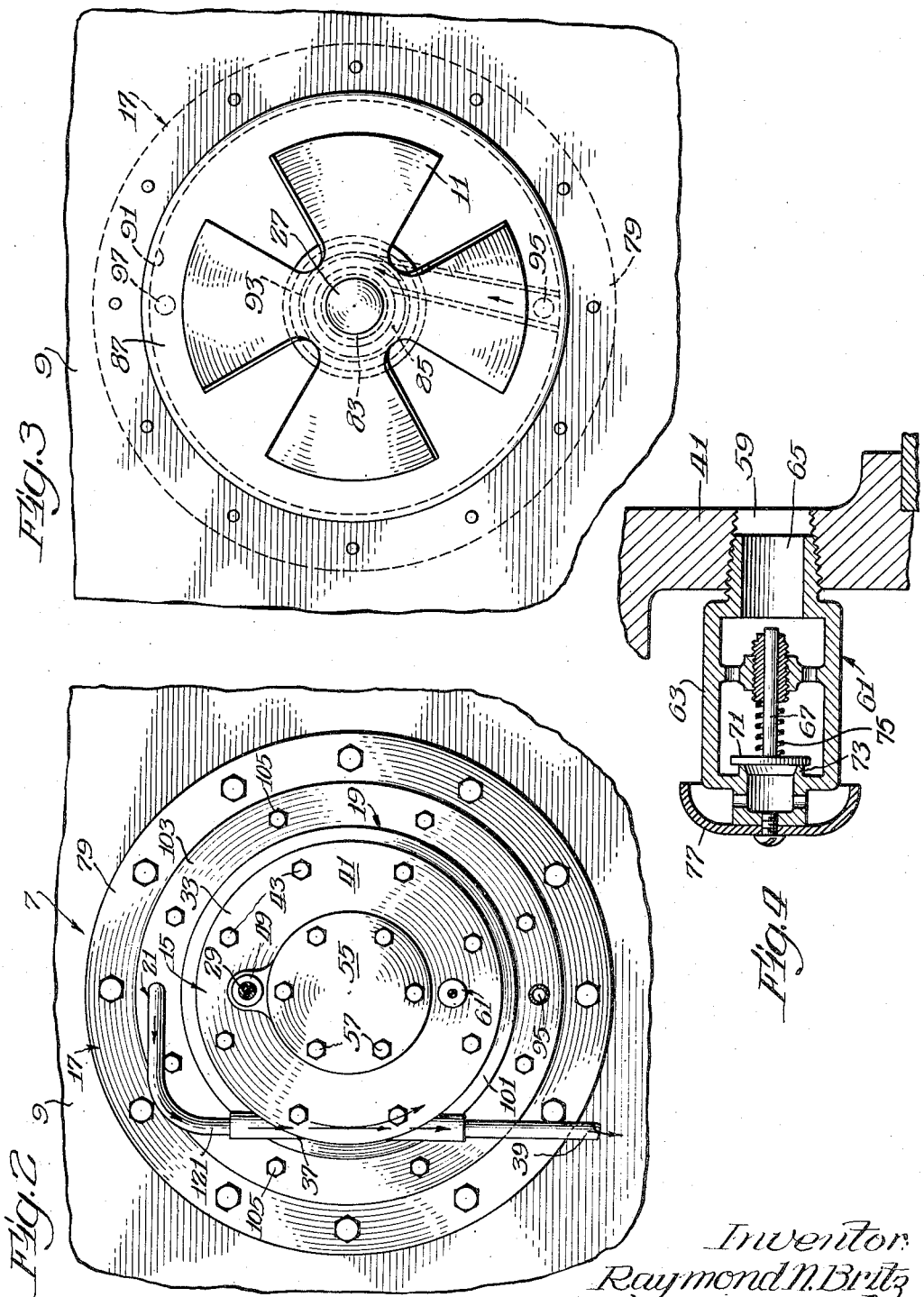

United States Patent Office 2,829,286
Patented Apr. 1, 1958

2,829,286

SEALED ELECTRIC MOTOR

Raymond N. Britz, Chicago, Ill., assignor to Kaybee Engineering Company, Inc., Westmont, Ill., a corporation of Illinois Application June 16, 1955, Serial No. 515,860

3 Claims. (Cl. 310—53)

This invention relates generally to electric motor driving means and more particularly, it relates to electric motor driving means for fans and other units operating in reactors, furnaces and the like, in which there are noxious gases.

In the operation of furnaces, reactors and the like, in which noxious gases are produced, it is frequently necessary to provide a blower, fan, or other agitating or driven means for proper operation. The driving means, of course, is usually an electric motor. In order to provide most direct and efficient drive for the driven means, most generally a fan and therefore generally referred to herein as a fan, the shaft of the electric motor extends directly into the furnace or reactor. However, because of the expansion and contraction of the shaft, partly due to the inherent heating of the shaft, the noxious gases in the furnace or reactor are drawn into the electric motor. As a result, the operation of the motor is impaired and the operating life of such motor is substantially reduced.

While indirect drive means may be provided, as by the provision of gear boxes, belt and pulley arrangements, etc., such indirect drive means represent added cost, reduced efficiency, increased maintenance and an overall less satisfactory arrangement.

Accordingly, a main object of this invention is the provision of an improved electric motor drive means for fans in furnaces and reactors containing noxious gases.

Another object of the invention is the provision of an improved electric motor drive means which can directly actuate the driven means in the furnace or reactor by means of the motor shaft.

A still further object of the invention is to provide an electric motor drive means which directly drives a fan in a furnace or reactor containing noxious gases and which will not draw such noxious gases into the electric motor.

Still further objects and advantages of the invention will become obvious and the invention will be more fully understood by reference to the following description and the accompanying drawings which illustrate a preferred embodiment of the present invention:

In the drawings:

Figure 1 is a cross sectional side view of the electric motor driving means of the present invention, the driving means being shown mounted on the wall of a furnace or reactor, which is only partly shown;

Figure 2 is a rear view of the electric motor driving means;

Figure 3 is a front view of the electric motor driving means;

Figure 4 is an enlarged cross sectional view of a breather valve which is shown in Figures 1 and 2.

As shown in the drawings, the electric motor driving means of the present invention, designated generally by numeral 7, is used in connection with a furnace 9 in which is disposed a fan 11. It will be understood, as previously indicated, that the electric motor driving means may be utilized in other units than furnaces and with other driven means than fans.

The electric motor driving means 7 comprises a conventional electric motor 13 around which is disposed a hollow casing 15, a hollow shield 17, and a mounting means 19 disposed intermediate the electric motor 13 and the shield 17. A conduit means 21 is also included for conducting fluid from the hollow shield 17 to the hollow casing 15, as will be hereinafter described.

The electric motor 13 comprises the usual stator 23 and rotor 25 which is mounted on a shaft 27. The stator is connected by suitable leads 29 to a source of electrical energy (not shown).

As before indicated, the casing 15 is connected to the mounting means 19, this being accomplished by suitable bolts 31 which extend through the mounting means 19 into the casing 15.

The casing provides a pressure-tight seal around the shaft 27 and includes a cylindrical shell 33 of double wall construction, thereby providing a chamber 35 in the shell for receiving liquid. The chamber 35 has an inlet 37 formed therein and an outlet 39 also formed therein for receiving and discharging liquid from the chamber 35. The inlet 37 and outlet 39 are diametrically opposed and are located at opposite ends of the shell 33.

The casing 15 further includes an end plate 41 which is connected by bolts 43 to the shell 33. The end plate 41 is provided with an opening 45 through which extend the leads 29 of the motor 13. Suitable washers 47 are provided in the opening 45 and around the leads to assure a pressure-tight seal, the washers being locked in place by a lock means 49.

The end plate also has bearing cavity 51 formed therein for receiving a roller bearing in which is disposed a roller bearing 53. A cover plate 55 closes off this cavity, the cover plate being bolted to the end plate 41 by bolts 57. This cover plate assures an air-tight seal at the end of the shaft.

The end plate 41 is provided with another opening 59 which is threaded to receive a one way valve 61 which is particularly shown in Figure 4. This valve is constructed to admit ambient air into the casing when the pressure in the atmosphere exceeds the pressure in the casing 15. In other words, the casing is sealed from the atmosphere when there is atmospheric or super-atmospheric pressure in the casing 15.

The valve 61 (Figure 4) comprises a hollow body section 63 having a threaded end 65 for engaging the opening 59 in the end plate 41. A plunger 67 is slidably supported in the body section 63, the plunger having a disc 71 carried on one end, the disc engaging a seat 73. The plunger is pressed toward the seat 73 by a spring 75. A cover 77 extends over the end of the one way valve 61 to limit entry of dirt, etc.

The shield 17 is mounted on the forward end of the electric motor driving means 7, the shield 17 including a circular plate section 79 which is provided with suitable openings 81 for bolting the means 7 to the furnace 9 which is provided with an opening 83 for receiving the shaft 27 of the motor 13. A cylindrical section 85 is integral with the plate section 79 and extends forwardly therefrom, the cylindrical section closely surrounding the shaft 27. The forward end of the cylindrical section 85 and the outer edge of the circular plate section 79 are covered by an outer plate section 87, these sections defining a chamber 91 through which fluid flows.

In the chamber 91 are disposed baffle plates 93 which cause the liquid in the chamber to pass through a tortuous path from an inlet opening 95 in the circular plate section 79 to an outlet opening 97 in the section 79. The path defined by the baffle plates 93 causes the fluid to initially contact the cylindrical section 85 and then the outer section 87 of the shield 17.

By the described construction of the shield 17, the entering fluid can cool the shaft 27 and shield the motor against undue temperature rises because of the temperature of the furnace 9.

The mounting means 19 comprises a generally cupped shaped unit 101 having a flange 103 for connecting to the shield 17, the flange having bolt holes 105 formed therein. The cupped shaped unit 101 is also provided with a journal section 107 for the shaft of the motor 13. In the journal section is disposed a conventional roller bearing 109, which is held therein by a plate 111. Forwardly of the plate 111 is a sealing collar which is keyed to the shaft 27, the collar being provided with a groove 115 which engages a ring 117 on the plate 111.

As before pointed out, the electric motor driving means of the invention includes conduit means 21 which communicates between the chamber 35 of the casing 15 and the chamber 91 of the shield 17. The conduit means comprises pipe or tubing 121 which connects to the outlet opening 97 of the shield and to the inlet opening 37 of the casing 15.

In the operation of the driving means 7 of the invention, the fluid is circulated into the opening 95 in the shield and is conducted through the tortuous path in the shield 17, the fluid leaving the shield through the opening 97. The fluid then passes through the pipe 121 and the shell 33 of the casing 15. The fluid leaves the casing through outlet 39.

When the furnace 9 is started up, the fluid tends to warm the casing 33 and, with the heat generated by the motor 13, causes the air around the motor to expand and create a pressure outwardly around the shaft 27 and against the sealing collar 115. Thus, the noxious gases from the furnace are prevented from entering the casing 15. After equilibrium conditions are established, the fluid tends to cool the motor 13 and the shield cools the shaft 27. When the furnace is shut down and the pressure in the motor 13 is reduced below atmospheric pressure, air is drawn from the surrounding atmosphere through the valve 61 so that the noxious furnace gases do not enter the motor 13. This assures long motor life and maximum operating efficiency.

It is, of course, important that the seal around the shaft forward of the motor be sufficient to overcome a back pressure which is greater than the actuating pressure for the valve 61.

The various features of the invention which are believed new are set forth in the following claims:

I claim:

1. An electric motor driving means comprising, in combination, an electric motor, a hollow-walled casing disposed around said motor and in spaced relation therefrom, a drive shaft connected to said motor and extending through said casing, said shaft being for disposal in a hot environment, a hollow shield surrounding said shaft, formed to surround said shaft in the hot environment and connected to a portion of said casing, means connected to said casing to provide a substantially airtight seal for said motor, means connected between said shield and said casing whereby the hollow portions of said shield and said casing communicate with each other so that coolant from said shield may be conducted to the hollow portion of said casing, and a one-way valve extending through said casing, said valve communicating with the atmosphere and operable to admit the atmosphere into the region of the motor only when the pressure is less than the pressure of the surrounding atmosphere.

2. An electric motor driving means comprising, in combination, an electric motor, a hollow-walled casing disposed around said motor and in spaced relation therefrom, a drive shaft connected to said motor and extending longitudinally through one end of said casing, said shaft being adapted for disposal in a hot environment, a hollow shield surrounding said shaft, connected to said casing and surrounding said shaft in the hot environment, means in said shield for conducting coolant into close proximity to said shaft and for conducting coolant away from said shaft, means connecting to said shield and to said casing to conduct coolant between the hollow portions of said shield and said casing, and a one-way valve extending through said casing and into the region of said motor in said casing, said valve communicating with the atmosphere and operable to admit the atmosphere to said region only when the pressure in said region is less than the pressure of the surrounding atmosphere.

3. An electric motor driving means comprising, in combination, an electric motor, a hollow-walled cylindrical casing disposed around said motor and in spaced relation therefrom, a shaft connected to said motor and extending outwardly from said casing, means for sealing one end of said casing and journaling one end of said shaft, means for closing the other end of said casing and rotatably supporting said shaft, a sealing collar around said shaft and connected to said closing means for releasing pressure air from said casing and blocking external air from said casing, a hollow shield surrounding a major portion of the shaft portion extending from said casing, said shield being connected to said casing and having channels formed therein to conduct coolant in proximity to said shaft, conduit connecting the hollow portions of said shield and said casing to conduct coolant from said shield to said casing, and a one-way valve extending through said casing into the region of said motor, said valve being adapted to admit atmosphere to said region only when the pressure in said region is less than the pressure of the surrounding atmosphere.

References Cited in the file of this patent

UNITED STATES PATENTS

| 2,152,586 | Freeman | Mar. 28, 1939 |
| 2,169,331 | Wechsberg | Aug. 15, 1939 |
| 2,226,986 | Wechsberg | Dec. 31, 1940 |
| 2,694,157 | Cone | Nov. 9, 1954 |

FOREIGN PATENTS

| 23,366 | Great Britain | Nov. 9, 1954 |